Figure 8:
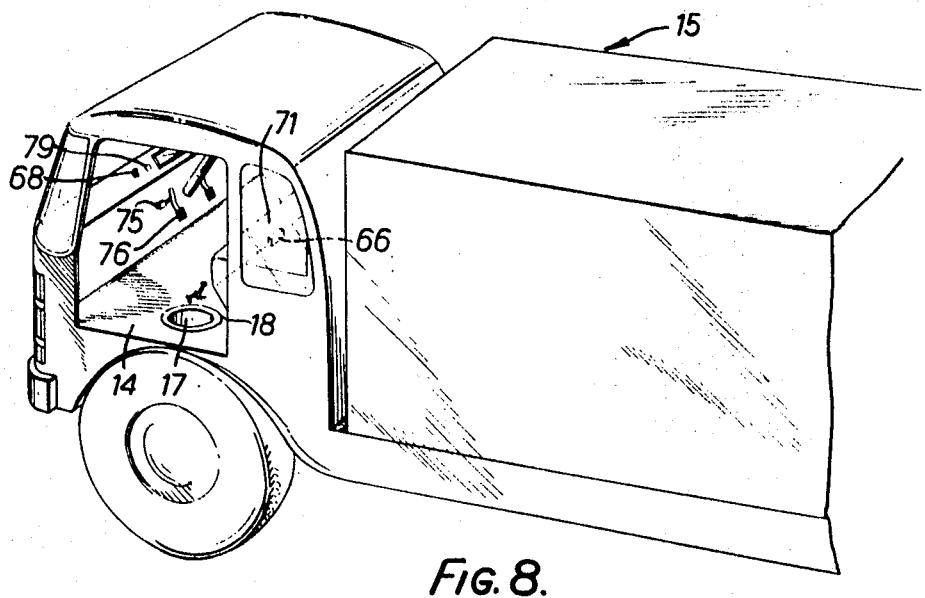

United States Patent

[11] 3,612,667

| [72] | Inventor | William John Austen Orr<br>Linden, The Ford, Donaghadee, County Down, Northern Ireland |
|---|---|---|
| [21] | Appl. No. | 26,302 |
| [22] | Filed | Apr. 7, 1970 |
| [45] | Patented | Oct. 12, 1971 |

[54] ROTATABLE AND RETRACTABLE SAFETY MIRROR FOR MOTOR VEHICLES
9 Claims, 9 Drawing Figs.

[52] U.S. Cl. ................................................ 350/289, 350/307
[51] Int. Cl. .................................................. G02b 5/08, B60r 1/06, B60r 1/08
[50] Field of Search ...................................... 350/289, 307, 302, 304, 6, 7, 21, 22; 74/501 M; 248/487, 495

[56] References Cited
UNITED STATES PATENTS
1,338,615  4/1920  Dysart et al. ............ 350/302
2,758,508  8/1956  Petri et al. ............... 350/307

FOREIGN PATENTS
866,047  4/1961  Great Britain ............ 350/307

*Primary Examiner*—David Schonberg
*Assistant Examiner*—John W. Leonard
*Attorney*—Watson, Cole, Grindle & Watson ABSTRACT: A safety mirror device for fitting underneath the body of a motor vehicle. The mirror is mounted on a support which is rotatable by an electric motor about a vertical axis and is mounted beneath an aperture in the floor of the driver's cab in a position in which the driver can look down through the aperture into the mirror. The mirror is hinged about a horizontal axis through one edge to the rotatable support, and is movable between a horizontal retracted position and a downwardly inclined operative position in which it enables the driver to view an area beneath the vehicle in successive directions through a 360° angular traverse as the mirror is rotated.

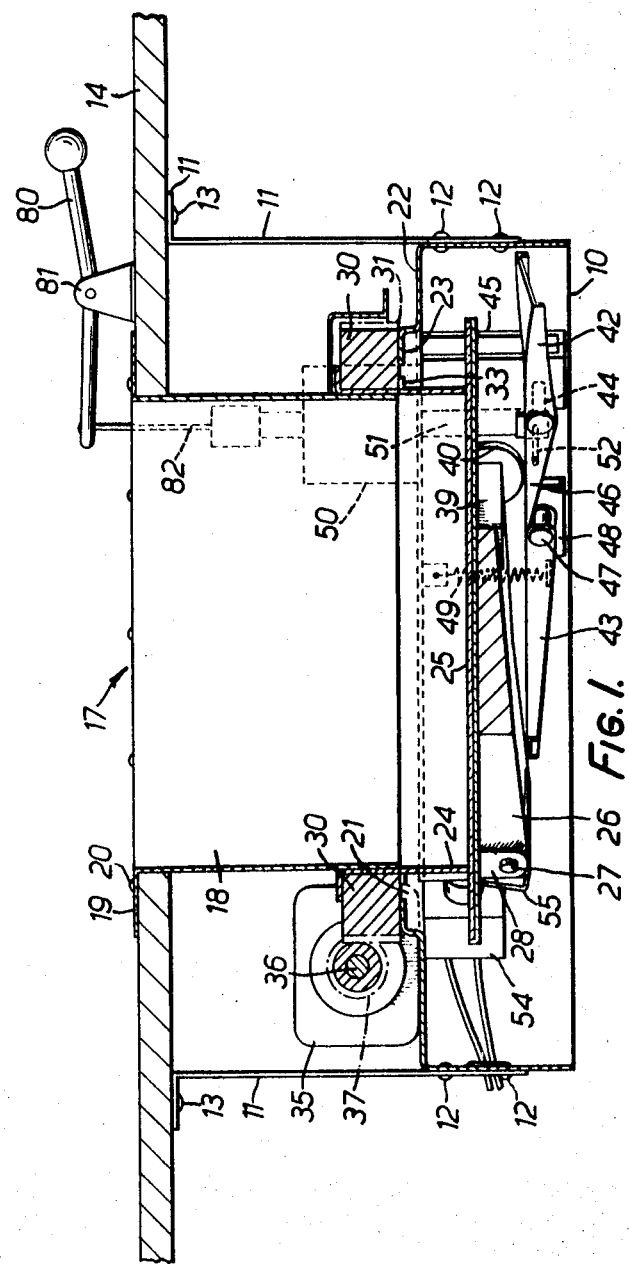

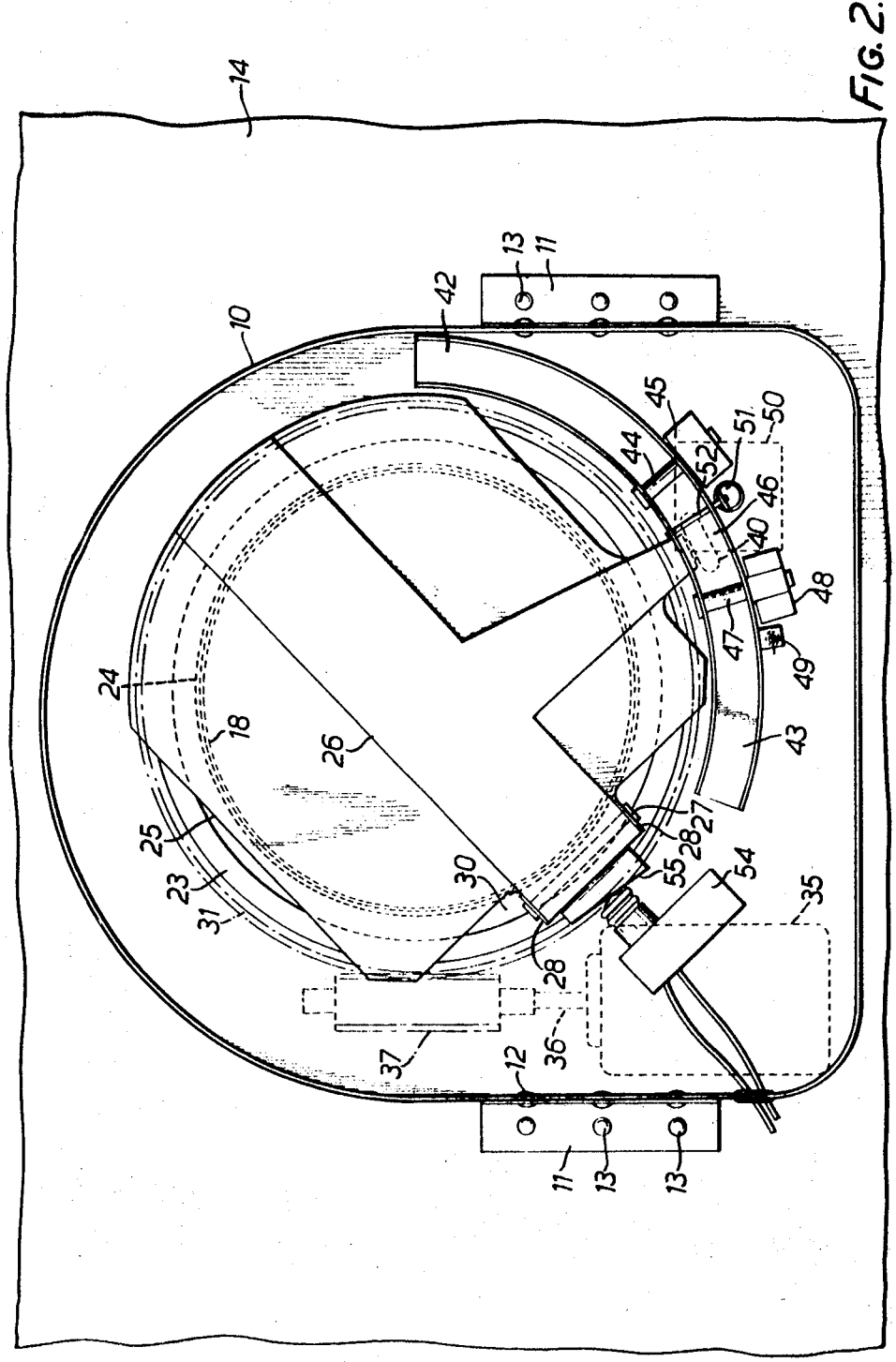

ROTATABLE AND RETRACTABLE SAFETY MIRROR FOR MOTOR VEHICLES

This invention relates to a safety mirror device for fitting beneath a motor vehicle for the purpose of viewing an area below the body of the vehicle, to enable the driver to make sure that the ground underneath the vehicle and in the immediate vicinity, which is out of the driver's direct field of vision, is clear of children, animals of obstructions, and to facilitate the reversing of the vehicle.

According to the present invention such a device comprises an inclined mirror carried by a support adapted to be mounted below the floor of the driver's cabin in a position such that the mirror can be looked into by the driver through an aperture in the floor, or through a second mirror or an optical system, to display to the driver a reflected view of an area of ground beneath the vehicle, and the mirror is rotatably mounted and is provided with means for rotating it about a vertical axis to cause it to scan the ground beneath the vehicle through a substantial angle around the said axis.

Thus by the rotation of the inclined mirror through its scanning angle, the driver is enabled to view successively in several or all directions beneath the body of the vehicle, for example through a complete 360° traverse or nearly so, to ensure that no obstructions are present before he drives off or reverses the vehicle. The rotatable inclined mirror also acts as a valuable supplement to the conventional rear vision mirror fitted to all vehicles as required by law, since it enables the driver to scan a much wider angle behind the vehicle for oncoming traffic than is normally possible with a conventional fixed rear vision mirror.

Preferably the mirror is movable up and down between an upwardly retracted position and a lower operative position in which it projects downwardly sufficiently below the vehicle body for viewing below the vehicle.

For example the mirror might be mounted at a fixed angle of inclination on a vertically movable support which is retractible together with the mirror into a fixed housing and can be advanced downwardly from the housing to move the mirror into its operative position, the support being also journaled for rotation about a vertical axis to provide for the scanning rotation of the mirror.

In a preferred arrangement, however, the mirror is hinged about a horizontal axis near its upper edge to the support, which is fixed in vertical height but is rotatable together with the mirror about the vertical scanning axis, so that when retracted the mirror lies horizontally but can be tilted downwardly into its inclined operative position below the support for use.

Preferably remote controlled motor means, for example an electric motor, is provided for producing the scanning rotation of the mirror and its support when in the operative position. Conveniently the same motor may be utilized through cam means, screw or other mechanism to provide the power for retracting the mirror upwardly from its operative position.

Thus in one construction in which the mirror is hinged to a support which is rotated about a vertical axis through the central region of the mirror by the motor, the mirror carries a roller spaced from its hinge axis and from the vertical axis of rotation, and the fixed housing carries a pair of pivoted arcuate ramps tiltable independently of one another between raised horizontal positions in alignment with one another and tilted positions in which they are inclined downwardly in opposite directions, the roller passing below the ramps when they are in their raised positions as the support is rotated by the mirror, but riding up one ramp to retract the mirror when that ramp is tilted down into its inclined position into the path of arcuate movement of the roller. After retraction the motor may be stopped to hold the mirror retracted with the roller resting on one of the horizontal ramps, and when the rotation of the support by the motor is restarted the roller will roll down the other ramp, pushing it down into its inclined position under the weight of the mirror to allow the mirror to tilt down into its operative position.

Figure 3:
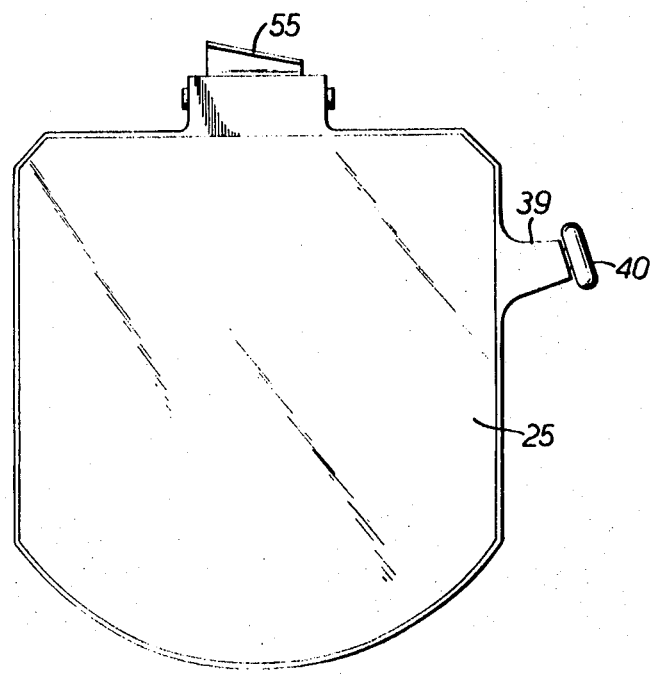
Figure 4:
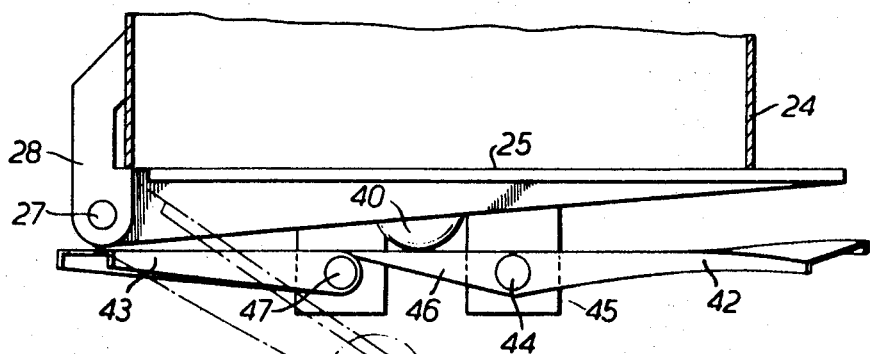
Figure 5:
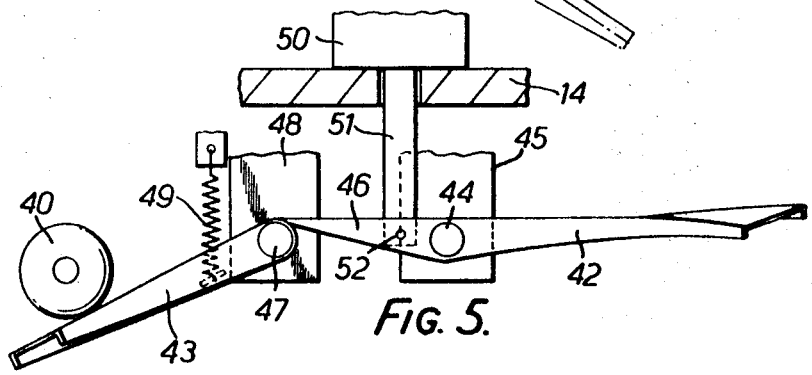
Figure 6:
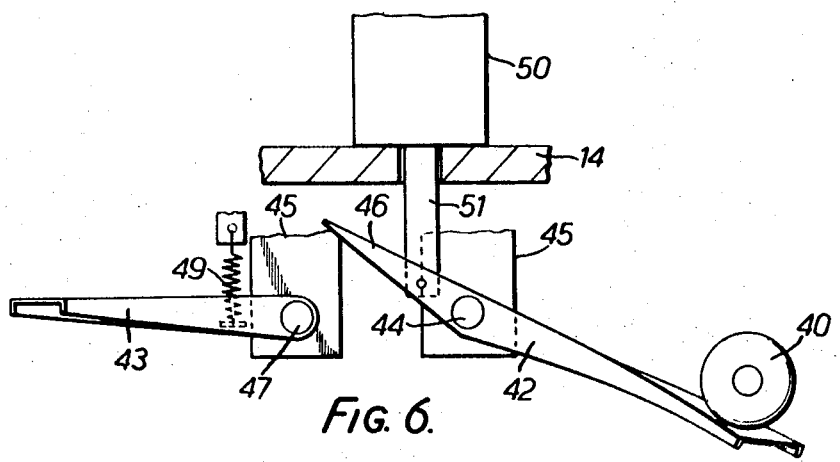
Figure 7:
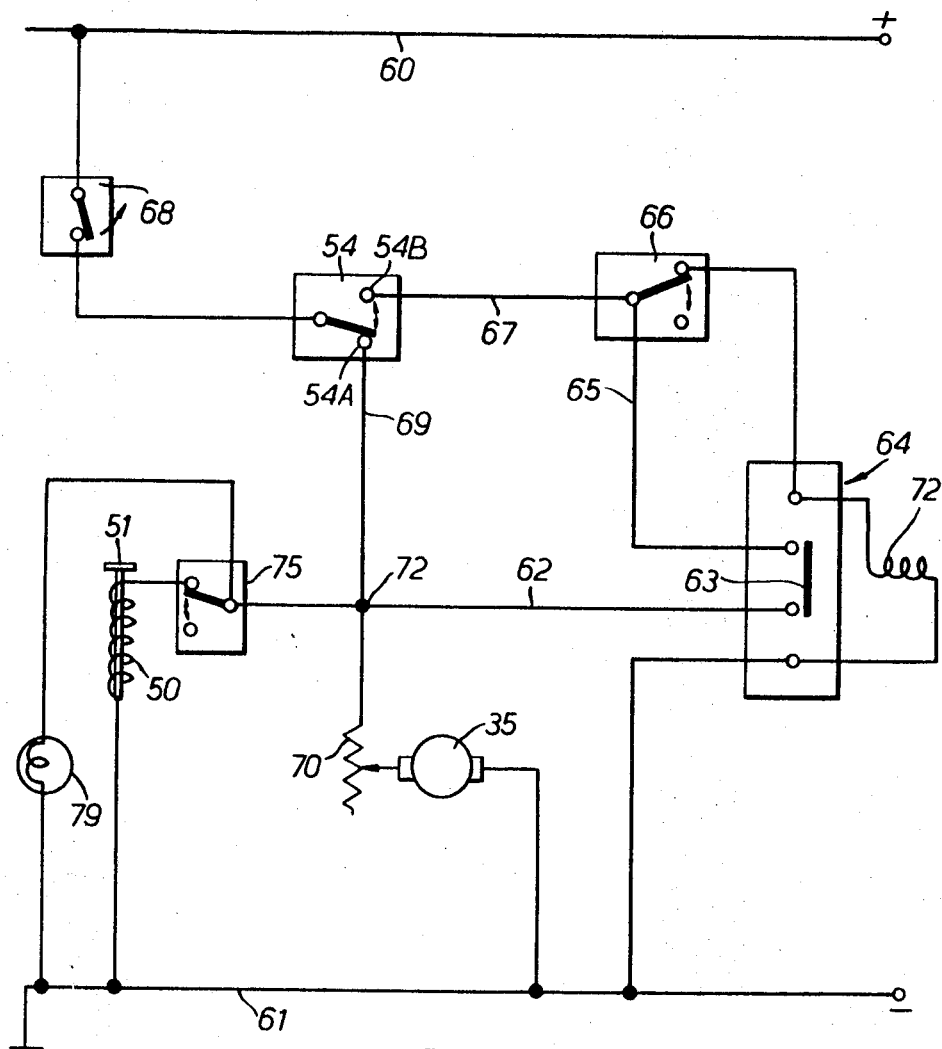

The invention may be carried into practice in various ways but one specific embodiment will now be described by way of example only, with reference to the accompanying drawings, in which FIG. 1 is a sectional elevation through a safety mirror device fitted on the underside of the body of the vehicle, FIG. 2 is an underneath plan view of the apparatus of FIG. 1, FIG. 3 is a plan view of the hinged mirror of the device, FIG. 4 is a side view of the mirror and its rotatable support showing the mirror roller resting in the retracted position on hinged ramps, FIG. 5 shows the ramps with the lifting ramp raised and the lowering ramp lowered to allow the mirror roller to descend, FIG. 6 shows the ramps with the lifting ramp lowered to cam the mirror roller upwardly for retracting the mirror, FIG. 7 is a circuit diagram showing the electrical connections of the safety mirror device, and FIG. 8 is a diagrammatic view showing the installation of the mirror device in a vehicle.

In the illustrated embodiment, the safety mirror device comprises a dished housing 10 made of sheet metal and secured by angle brackets 11, rivets 12 and screws 13 to the floor 14 of the body of a goods delivery vehicle 15. The fixed housing 10 is secured below a circular aperture 17 formed in the floor 14 of the vehicle body in a position in front of the driver's seat and a cylindrical vision tube 18 is inserted through the circular aperture 17 and is secured by means of a mounting flange 19 and screws 20 to the floor 14.

The fixed housing 10 has a near central aperture 21, and a raised lip 23 surrounding the aperture 21 acts as a bearing support for a rotary sheet metal supporting sleeve 24 to which is hinged a tiltable mirror 25. The mirror 25 is mounted on a supporting arm 26 hinged by means of a pin 27 to downwardly directed lugs 28 which are secured to the cylindrical sleeve 24. The mirror is tiltable about the axis of the hinge pin 27 between a horizontal position shown in FIGS. 1 and 4, and referred to as the retracted position, in which it is abutted against the lower edge of the supporting sleeve 24, and a downwardly inclined position shown in chain lines at 25' in FIG. 4, which is referred to as the operative position.

A gear ring 30 having external worm teeth 31 is coaxially secured to the sleeve 24 between the top flange 32 of the latter and a number of supporting lugs 33 which are struck out from the sleeve. The gear ring is made of a self-lubricating plastics material, for example graphite-impregnated nylon, and rests on the bearing lip 23 of the fixed housing 10. An electric driving motor 35 is mounted in the housing and its spindle 36 carries a worm 37 in meshing engagement with the teeth 31 of the gear ring 30, so that the motor 35 when energized will rotate the supporting sleeve 24 and the hinged mirror 25 about the vertical axis of the gear ring.

The mirror 25 has a laterally projecting arm 39 on the outer end of which is journaled a roller 40 which is employed for tilting the mirror up and down about the hinge axis and for holding it in a given orientation. The mirror tends to tilt downwardly under gravity into its inclined operative position, in which its plane face lies at an angle of 40°–45° to the horizontal, but can be raised and supported in its retracted position by means of a pair of hinged ramps 42 and 43 which cooperate with the roller 40. Each of the ramps 42 and 43 is of channel section and is arcuate in plan, and the ramp 42, which is longer than the ramp 43, is also twisted slightly into part-helical formation. The ramp 42 is pivotally mounted on a spindle 44 positioned radially with respect to the housing 10 and carried by a supporting leg 45 depending from the housing. The pivot point of the ramp 42 is located about one third of the length of the ramp from the end of the ramp which is adjacent to the other ramp 43. When raised into its horizontal position as shown in FIGS. 1 and 4, the tail 46 of the ramp 42 rests on the adjacent end portion of the shorter ramp 43, which is pivoted at its extreme end by means of a second radial spindle 47 to a second supporting leg 48. In this condition the tail 46 of the longer ramp 42, bridging the gap between the spindles 44 and 47, forms a firm platform on which the roller 40 can rest, to hold the mirror in its horizontal retracted position.

The ramp 43, being considerably shorter than the ramp 42, has a plane upper surface and is not helically twisted. It is urged upwardly into its horizontal position against a stop by means of a spring 49, but can be tilted downwardly by the weight of the mirror 25 against the force of the spring 49 when the roller 40 travels past the spindle 47 onto the extending upper surface of the ramp 43, as seen in FIG. 5. The ramp 42 is controlled by means of a solenoid 50 whose armature plunger 51 is coupled by means of a pin 52 to the tail 46 of the ramp. When the solenoid is deenergized its plunger 51 holds the ramp 42 in the horizontal raised position. When the solenoid is energized the plunger 51 moves vertically upwards and raises the tail 46 of the ramp 42, thereby tilting the main portion of the ramp downwardly beyond the spindle 44, to hold the ramp in an inclined position to enable the roller 40 to run up it and retract the mirror. A microswitch 54 is mounted on the fixed housing 10 in a position in which it will be actuated by a striker 55 on the edge of the mirror 25 behind the hinge 27 when the mirror is rotating in its raised horizontal position, such actuation serving to interrupt the power supply to the driving motor 35 and to halt the mirror at an instant when the roller 40 is positioned on the tail 46 of the ramp 42 between the two spindles 44 and 47. It will be observed however that when the mirror is being rotated by the motor 35 in its downwardly inclined operative position with the two ramps 42 and 43 raised into their horizontal positions, the roller 40 will pass below the ramps so that the mirror will not be retracted and the striker 55 will pass clear of the button of the microswitch 54 without actuating it to interrupt the rotation of the mirror.

The electrical circuit diagram of the device as installed in the vehicle is shown in FIG. 7. The driving motor 35 can be connected between the positive lead 60 of the electric wiring circuit connected to the vehicle battery, and the earthed negative lead 61, through a lead 62, contacts 63 of a relay 64, a lead 65, a second microswitch 66, a lead 67, the microswitch 54 and an on-off master switch 68 mounted on the control panel of the vehicle. A lead 69 however connects the normally closed contact 54A of the switch 54 direct to the motor, bypassing the second switch 66 and the relay 64. A rheostat 70 is also connected in series with the motor 35 to provide speed control, but this is an optional feature and may be omitted if variable speed of rotation of the mirror is not required. The second microswitch 66 in mounted below the driver's seat 71 in the cabin of the vehicle and is arranged to be actuated by the slight downward movement of the seat frame under the driver's weight when the driver sits down in his driving position in the cabin. The microswitch 66 controls the energization of the main relay winding 72 of the relay 64 by which the movable contact 63 of the relay is moved to is closed position. The relay 64 includes holding contacts (not shown) by which the relay is held in the closed condition so long as current is passing through it, even though the microswitch 66 may no longer be closed. The microswitch 66 is a single-way on-off switch which closes when actuated by depression of the driver's seat, to energize the relay winding 72 and close the relay contacts 63, after which the switch 66 automatically reopens and the relay remains held closed by the holding contacts so long as current flows through it, even through the switch 66 may be reopened.

The microswitch 54 however is a two-way switch which is normally closed onto contact 54A to bypass the relay 64 but when actuated by the striker 55 closes onto the normally open contact 55B to switch the power supply through lead 67 to the relay circuit.

The solenoid 50 which controls the position of the ramp 42 is energized via a microswitch 75 arranged to be actuated by the depression of the vehicle clutch pedal 76 by the driver when he starts the vehicle moving off from standstill. The switch 75 is connected to the junction 78 of the leads 62 and 69. In addition, a warning lamp 79 mounted on the control panel in the driver's cabin is connected between the junction 78 and the earth lead 61 so as to be illuminated whenever the master switch 68 is closed and the mirror is in its lowered position.

The sequence of operation of the device will now be described, assuming that initially the mirror is in its retracted position with the roller 40 resting on the tail 46 of the ramp 42, and the driver's seat 71 is empty. The microswitch 54 will be in its actuated position closed onto the contact 54B by engagement with the striker 55, and the master switch will be already closed.

When the driver enters the vehicle and sits down on the seat 71, his weight actuates the seat microswitch 66 to close it, so that the power supply from the vehicle will be supplied to the relay winding 72 to close the relay and hence to energize the motor 35. The motor starts to rotate the mirror support 24 and the mirror 25, so that the roller 40 runs past the spindle 47 and down the ramp 43, as shown in FIG. 5, depressing the ramp into its inclined position, and the mirror tilts down into its inclined operative position. The spring 49 retracts the ramp 43 when the roller 40 has left it. The microswitch 54 opens as the striker 55 moves clear of it, bypassing the relay 64 and energizing the motor 35 through the contact 54A and lead 69. The relay 64 opens again, and the motor continues to rotate the mirror and its support, so that the mirror traverses continuously. The driver is thus enabled to view the ground beneath and adjacent to the vehicle in all directions, reflected in the mirror as it progressively scans through a 360° arc. This rotary scanning by the mirror will continue without interruption until either the driver opens the master switch 68, or he depresses the clutch pedal prior to driving away and so actuates the solenoid microswitch 75. If he opens the master switch 68, the power supply to the motor is interrupted and the rotation of the mirror is stopped instantaneously. This enables the driver to study the reflected image in the stationary mirror in its particular orientation, for example prior to reversing the vehicle. Thus by the use of the switch 68 the driver can stop the mirror in any desired position which it has reached, and can restart the rotation of the mirror simply be reclosing the switch 68.

As soon as the driver depresses the clutch pedal with the mirror rotating, the microswitch 75 will be actuated to energize the solenoid, causing it to raise the tail 46 of the ramp 42 and tilt the leading end of the ramp down into the path of movement of the roller 40 carried by the rotating mirror, so that as the mirror completes its 360° traverse the roller 40 will run up the ramp 42, as indicated in FIG. 6, retracting the mirror into its horizontal position, until the striker 55 actuates the microswitch 54 and interrupts the power supply, stopping the motor to halt the mirror in its retracted position. The apparatus is now once more in condition for another operating cycle which will be initiated immediately the driver next resumes his position on the driving seat after leaving it, for example to deliver goods.

If the driver wishes to initiate a further scanning traverse by the mirror without first leaving and then resuming his seat, he can reach down and actuate the seat microswitch 66 manually. If desired a suitable manual control lever can be provided for this purpose.

During the whole time that the master switch 68 is closed and the mirror is in its inclined operating position, with the microswitch 54 closed on contact 54A, the warning lamp 79 will be illuminated. If desired the warning lamp 79 may be provided with a flasher unit by which its supply is cyclically interrupted, so that it will give a flashing indication instead of continuous illumination.

If the construction of the driver's seat is such that a fixed seat frame is essential, the microswitch 66 may be replaced a pressure-responsive switch actuated in response to the pressure in an air bag or the like incorporated in or below the seat.

The mirror unit in its housing 10 must be mounted in a position close to the driver's seat at floor level, where the driver can look straight down through the vision tube 18 into the central region of the mirror. In FIG. 8 the unit is mounted in front of the driver's seat 71, but in certain cases a position to one side of the seat may be preferred. For vehicles in which the mounting position of the mirror would be too high for vision beneath the vehicle body, one of a set of extension tubes of different lengths may be fitted instead of the vision tube 18, and longer mounting brackets 11 would be used.

The microswitch 75, instead of being operated by the clutch pedal of the vehicle, might be associated with the accelerator pedal of the vehicle for automatic actuation when the accelerator pedal is depressed. Such an arrangement would be used in the case of a vehicle fitted with automatic transmission and having no clutch pedal.

As a safety precaution to enable the driver to be able to retract the mirror before he drives the vehicle away, in the event of a failure of the solenoid 50, a manual lifting lever 80 is mounted on a bracket 81 on the floor 14 of the vehicle as shown in FIG. 1, and is connected by a cable or link 82 to the upper end of the solenoid plunger 51. By depressing the lever 80 the driver can lift the solenoid spindle manually and hence cause the ramp 42 to tilt down into its camming position in the path of the roller 40, so that the mirror will then be retracted by the roller riding up the ramp.

Whilst in the specific embodiment described above the mirror is a hinged flap on a rotary support mounted at a fixed level, and a ramp and roller arrangement is provided for retracting it, various other retraction arrangements are possible. Thus a direct mechanical lift, actuated manually by cables, might be employed for retracting the hinged mirror. Again, the mirror might be mounted in a fixed inclination on a rotatable support which was itself capable of being raised and lowered vertically to move the mirror out of and into its lowered operating position. The raising of the platform might be performed by means of a lifting yoke whose arms are coupled by pin and slot connections with slides in engagement with opposite sides of the mirror support, and a manually operating cable might be coupled to the yoke to raise and lower it. Again a leadscrew mechanism driven by the main driving motor itself or by a separate motor might be employed to elevate and lower the mirror support whilst it is being rotated by the main motor. Other arrangements for raising and lowering the mirror support may make use of electromagnetic means such as one or more remote-actuated solenoids coupled to the support, or a hydraulic or pneumatic plunger arrangement.

Figure 9:
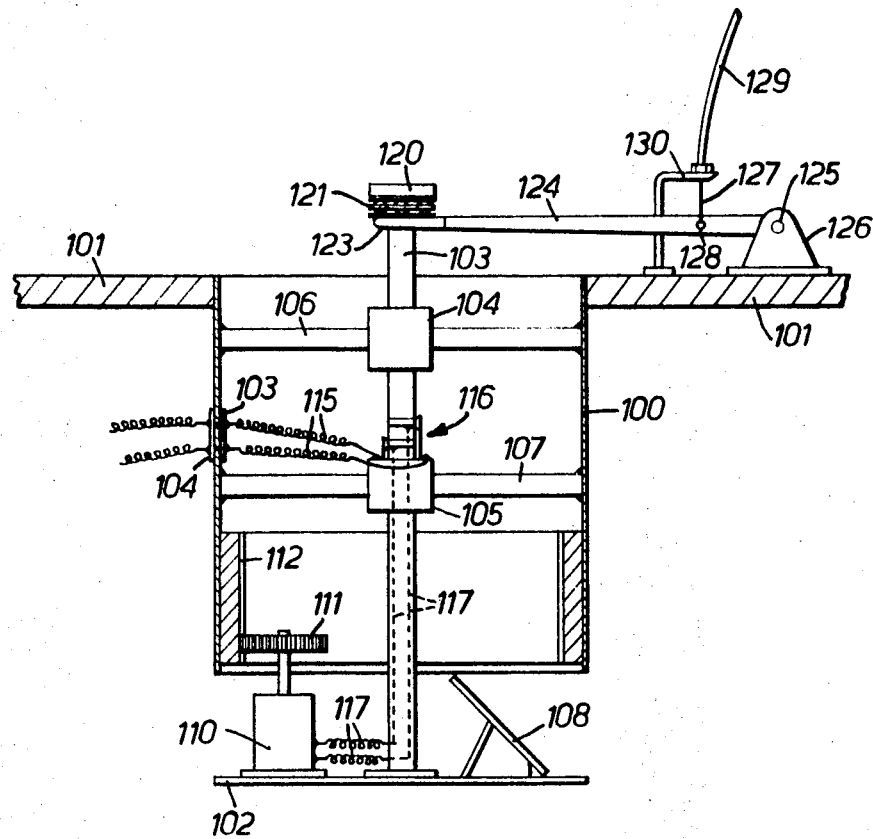

Thus in the embodiment illustrated in FIG. 9, which shows in sectional side elevation a modified arrangement in which the mirror does not tilt, the device comprises a fixed cylindrical housing 100 open at top and bottom and having its upper end secured in an aperture in the floor 101 of the vehicle cabin so that the housing 100 projects beneath the underside of the vehicle. A rotary supporting disc 102 is mounted on the lower end of a spindle 103 which extends coaxially through the housing 100 and is journaled in bearings 104, 105 carried by spider arms 106, 107 which extend across the interior of the fixed housing 100 and are secured thereto. The spindle 103 and supporting disc 102 are thus rotatable about the vertical axis of the spindle in and relatively to the fixed housing 100. An inclined mirror 108 is mounted on the upper surface of the supporting disc 102 in an offset position on one side of the spindle 103. The mirror is fixed at an angle of inclination of about 45° to the horizontal in an outwardly facing position so that a person looking down from above through the housing 100 will be able to see reflected in the mirror an area below the vehicle in the radially-outward direction. In an offset position on the other side of the spindle 103 from the mirror, there is mounted on the upper side of the supporting disc 102 an electric motor 110 whose axis is vertical. On the vertical shaft of the motor 110 is mounted a gear pinion 111 in engagement with a gear ring 112 mounted in the lower end of the fixed housing 100. The gear ring 112 has straight, vertical teeth of substantial length. The motor 110 is energized from supply terminals 113, 114 on the fixed housing via leads 115, slip rings 116, and further leads 117 which extend down the spindle 103 through channels therein to the disc 102. The motor 110 rotates the pinion 111 in engagement with the fixed gearing 112, and thus causes the rotation of the complete assembly of the spindle 103, disc 102, inclined mirror 108 and motor 110 about the vertical axis of the spindle, through one or more complete rotary cycles each of 360°.

The spindle 103 is vertically movable in the bearings 104, 105 for the purpose of retracting the supporting disc 102 from its operative position shown in FIG. 9 in which the mirror 108 is exposed beneath the bottom of the housing 100, to a retracted position in which the disc closes the bottom of the housing and the mirror is withdrawn within the interior of the housing. For this purpose the upper end of the spindle 103 is supported by means of a flange 120 and thrust bearing 121 on the forked end 123 of a lever 124 which is pivotally mounted at 125 on a supporting bracket 126 fixed to the vehicle floor 101. A flexible cable 127 is attached to the lever 124 at a point 128 near its fulcrum 125, the sheath 129 of the cable being anchored to a support 130 on the floor 101. The remote end of the flexible cable 127, 129 is attached to a manual control (not shown) in the driver's cabin.

Thus the driver, by actuating this manual control, can swing the lever 124 up and down about its fulcrum 126 and thereby raise and lower the spindle 103 and disc 102, for the purpose of moving the inclined mirror 108 between its operative and retracted positions. This vertical movement of the disc 102 is permitted by the long straight vertical teeth of the gear ring 112, the latter being wide enough to permit the pinion 111 to move through the required vertical distance by sliding relatively to the gear ring teeth while remaining in meshing engagement therewith.

Thus when the disc 102 is lowered by means of the lever 124 so that the mirror is in its operative position, the energization of the motor 110 will rotate the spindle 103 and disc 102 to cause the mirror 108 to perform a scanning cycle throughout a complete 360° angle of traverse, or several successive 360° scanning cycles, for the purpose of viewing the area beneath the vehicle in all horizontal directions.

What I claim as my invention and desire to secure by Letters Patent is:

1. A safety mirror device adapted to be mounted to he underside of the floor of a motor vehicle for viewing an area below the body of a vehicle comprising: a fixed housing mounted to the under side of the motor vehicle floor beneath an aperture in the floor close to the drivers seat, a supporting sleeve mounted to said fixed housing for a complete 360° rotation about a vertical axis with respect thereto, a mirror hingedly secured to said sleeve beneath the aperture in the floor for pivotal movement about a horizontal axis between a fully retracted position parallel to the floor and an inclined operative position extending below the vehicle, means pivotally secured to said fixed housing for supporting said mirror in its fully retracted position, bearing means on the underside of said mirror for resting said mirror on said support means, means for rotating said sleeve and said attached mirror whereby, during rotation, said bearing means is moved off one end of said support means and said mirror is thereby tilted downward under its own weight to its inclined operative position so as to scan the area beneath the motor vehicle throughout 360°, and means controlled by the driver for selectively tilting said support means into the path of said bearing means whereby said mirror is made to move towards its fully retracted position as said bearing means moves along said support means towards its initial position.

2. The device according to claim 1 wherein said bearing means comprises a roller, and wherein said support means comprises a first ramp pivotally secured at one end and a second ramp pivotally secured between its ends so as to define a tail section, said ramps lying in a common horizontal plane with said tail section resting on the pivot point of said first ramp while supporting said mirror in its fully retracted position.

3. The device according to claim 2 wherein said second ramp is of a configuration which is slightly twisted into a part-helical formation, and wherein said roller is so positioned on the underside of said mirror as to lie between the pivot points of said first and second ramps.

4. The device according to claim 3 wherein said roller rolls along the top surface of said tail section and first ramp thereby depressing said first ramp, during continued rotation of said mirror, until said roller is moved completely beyond the end of said first ramp whereafter a coil spring, interconnecting said first ramp with said fixed mount, serves to return said first ramp to its original horizontal position.

5. The device according to claim 4 wherein said support means which is tilted into the path of said bearing means comprises said second ramp, and wherein said means for tilting comprises a solenoid having a plunger connected to said second ramp tail section, energization of said solenoid serving to thereby tilt said second ramp downwardly into the path of said bearing means whereafter said roller moves along said second ramp toward its pivot point so as to return both said second ramp and said mirror to their respective horizontal positions.

6. The device according to claim 5 wherein said means for rotating said sleeve and said attached mirror comprises a gear ring secured to said sleeve and an electric driving motor turning a worm intermeshing with the teeth on said gear ring, said motor being electrically connected to a power supply.

7. The device according to claim 6 wherein switch means are provided and arranged so as to interrupt said power supply and stop rotation of said mirror when it reaches a position in which said roller rests on said second ramp tail section.

8. The device according to claim 1 in combination with a motor vehicle having a driver's seat, first switch means mounted below said driver's seat and arranged to automatically initiate rotation of said sleeve and said attached mirror in response to a depression of said driver's seat after a driver sits down thereon.

9. The device according to claim 8 further including a second switch means associated with a driving control of the vehicle and arranged to be actuated automatically on the operation of said driving control for starting forward or reverse movement of the vehicle, actuation of said second switch means also serving to energize said solenoid to raise said tail section, and a third switch means being provided to interrupt said power supply for stopping said motor to halt said mirror in its retracted position.